(No Model.) 3 Sheets—

C. B. WITHINGTON.
PHOTOGRAPHIC CAMERA.

No. 501,703. Patented July 18, 1893.

ON 2—2

Witnesses,
Sidney P. Hollingsworth
Horace A. Dodge.

CHARLES B. WITHINGTON
Inventor,
by his attorneys,
Dodge Sons.

(No Model.) 3 Sheets—Sheet 2.

C. B. WITHINGTON.
PHOTOGRAPHIC CAMERA.

No. 501,703. Patented July 18, 1893.

Witnesses:
Sidney P. Hollingsworth
Horace A. Dodge

CHARLES B. WITHINGTON
Inventor,
by his attorneys,
Dodge & Sons.

(No Model.) 3 Sheets—Sheet 3.
C. R. WITHINGTON.
PHOTOGRAPHIC CAMERA.
No. 501,703. Patented July 18, 1893.
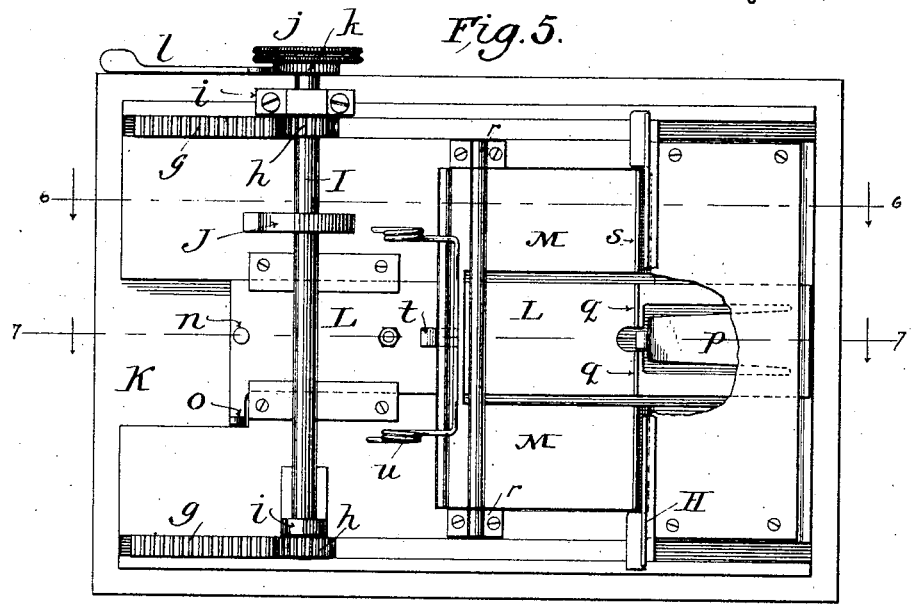
Fig. 5.
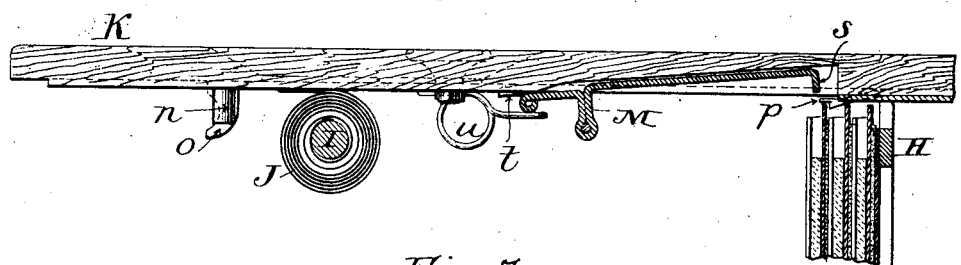
Fig. 6.
ON 6—6
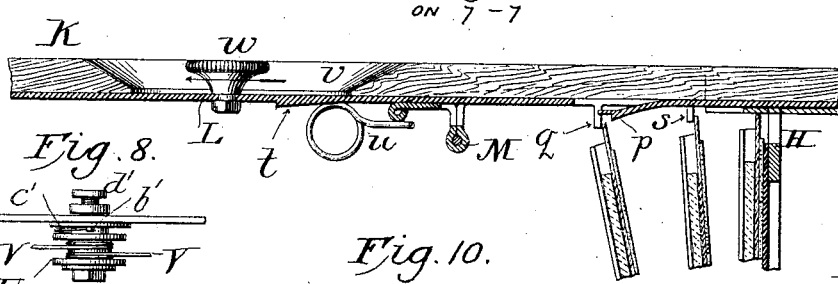
Fig. 7.
ON 7—7
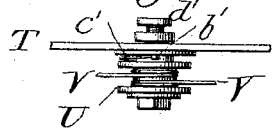
Fig. 8.
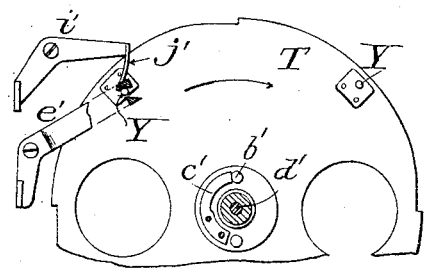
Fig. 10.
Fig. 9.
Witnesses,
Sidney P. Hollingsworth
Horace A. Dodge.
CHARLES B. WITHINGTON
Inventor,
by his attorneys,
Dodge & Sons.

UNITED STATES PATENT OFFICE.

CHARLES B. WITHINGTON, OF JANESVILLE, WISCONSIN.

PHOTOGRAPHIC CAMERA.

SPECIFICATION forming part of Letters Patent No. 501,703, dated July 18, 1893.

Application filed May 31, 1892. Serial No. 435,001. (No model.)

*To all whom it may concern:*

Be it known that I, CHARLES B. WITHINGTON, a citizen of the United States, residing at Janesville, in the county of Rock and State of Wisconsin, have invented certain new and useful Improvements in Cameras, of which the following is a specification.

My invention relates to cameras, and consists in various features, details and combinations hereinafter set forth and claimed.

Figure 1:
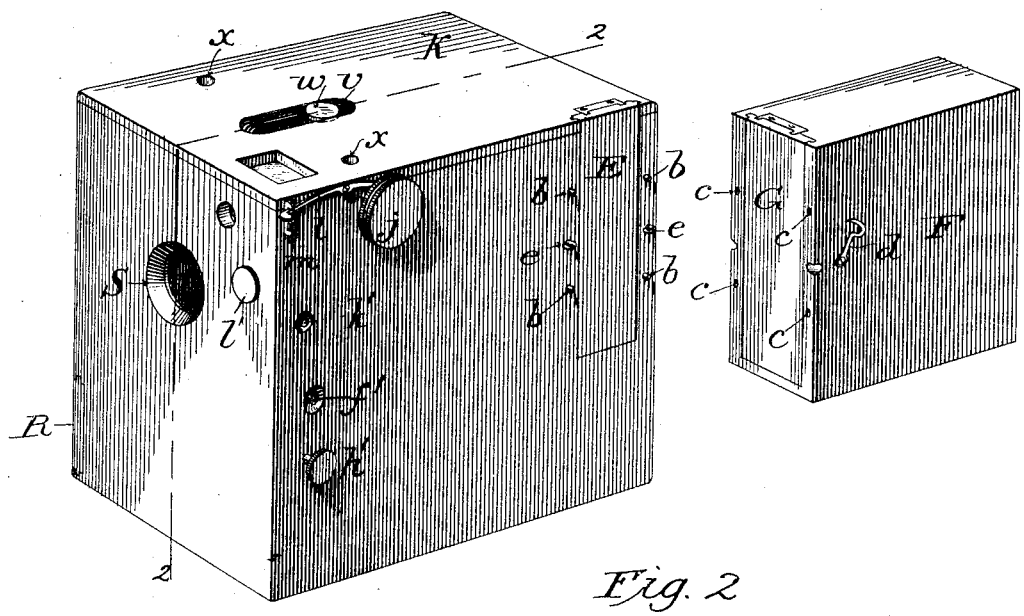
Figure 2:
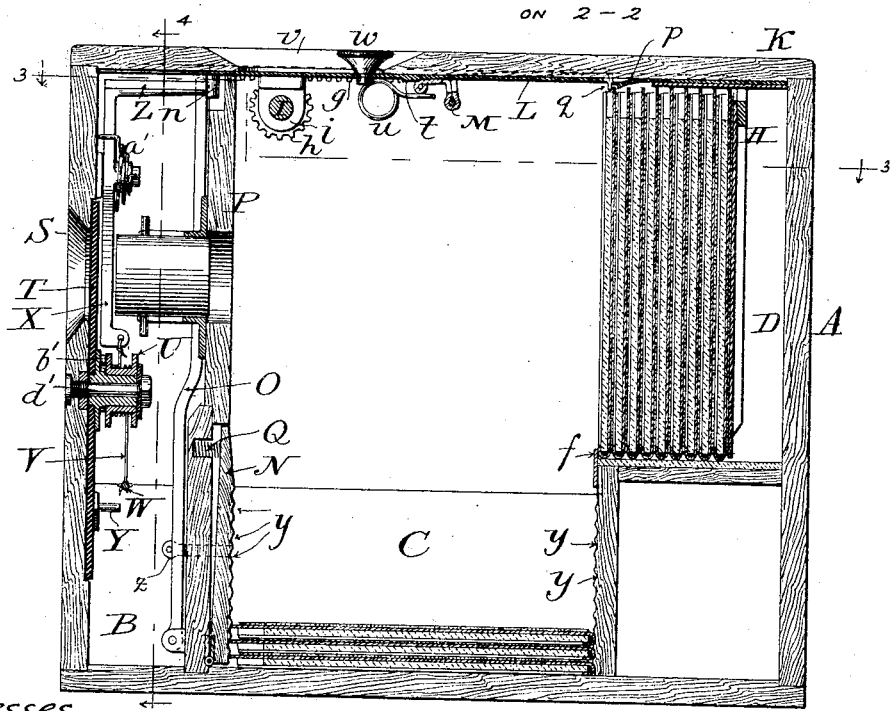
Figure 3:
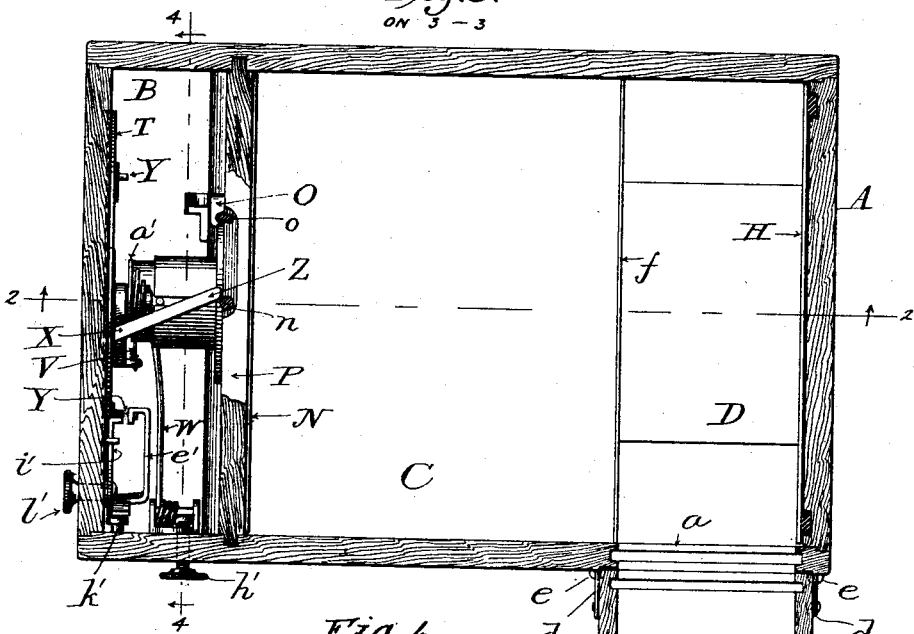
Figure 4:
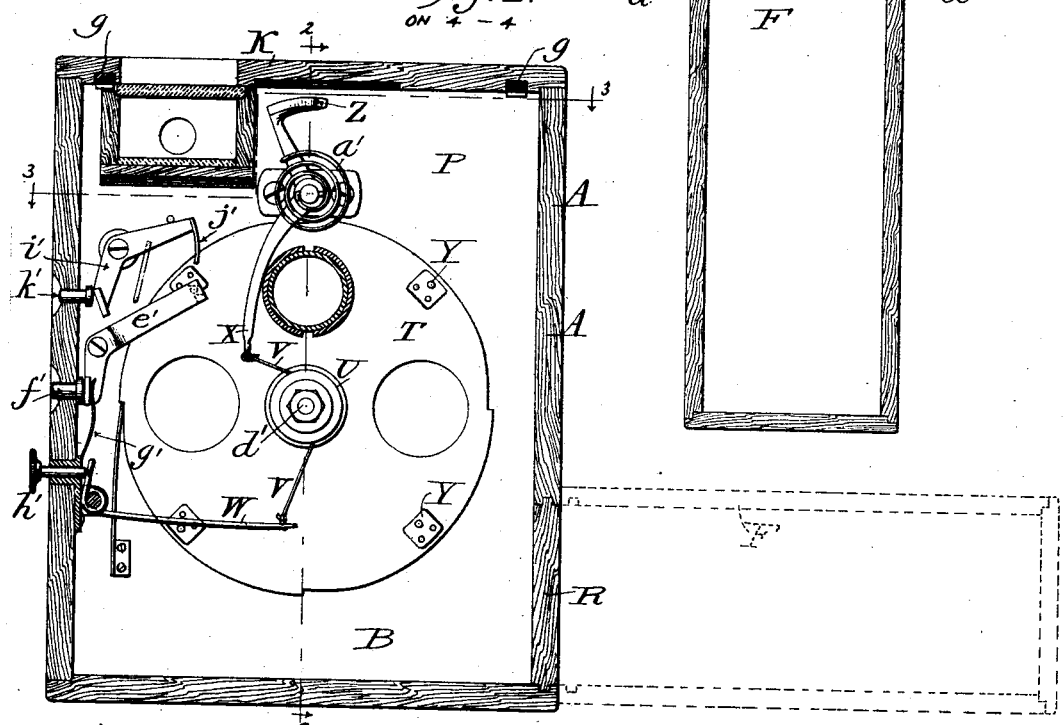

In the accompanying drawings,—Figure 1 is a perspective view of my improved camera and the box for holding the plates to be inserted into the camera. Fig. 2 is a vertical central sectional view of the same on the line 2—2 of Fig. 1. Fig. 3 is a horizontal sectional view on the line 3—3 of Figs. 2 and 4; Fig. 4, a vertical transverse sectional view on the line 4—4 of Figs. 2 and 3; Fig. 5, a bottom plan view of the top or cover showing the mechanism for releasing the plates one by one; Figs. 6 and 7, longitudinal sectional views of the same showing the parts in different positions; and Figs. 8, 9 and 10, views illustrating certain details of construction.

A indicates the box of the camera as a whole, which is divided into a shutter compartment B, an exposed-plate-compartment C, and an unexposed plate compartment D. In the side of the box A is an opening $a$ of a height equal to that of the plates, which is designed to be closed by the vertically sliding door E, as shown in Fig. 1. On the face of the box, adjacent to the walls of the opening $a$, are secured one or more pins or studs $b$, which are designed to enter corresponding holes $c$ formed in the end of the box or holder F, which is designed to contain the new or unexposed plates. This box F is provided at one end with an opening of a size corresponding to the opening $a$ in the side of the box A, and is provided with a vertically sliding door G, as shown in Fig. 1. The box F is further provided with one or more hooks or fastening devices $d$ designed to engage an eye or eyes $e$ secured to the side of the box A, as shown in Figs. 1 and 3.

When it is desired to charge the camera with new plates, the box F, previously charged with such plates, is applied to the side of the box A in the manner shown in Fig. 3, and is fastened or otherwise secured thereto by means of hooks $d$, or in any other equivalent manner. The doors E and G are now raised vertically and the camera tipped over on its side somewhat so as to cause the plates to move or fall bodily into the compartment D. After the plates are thus moved into the box A, the door E is closed and the box F disconnected from the box A. By having the boxes F and A fit closely together as shown and described, the plates will not be injured or struck by the light in moving them from the holder into the camera.

The bottom wall or floor of the compartment D is provided along its front edge with an upwardly-projecting ledge $f$, as shown in Figs. 2 and 3, which ledge prevents the plates from moving forward at their lower edges.

Prior to the insertion of the plates into the compartment D, the follower H should be moved back to the rear wall of the compartment as shown in Fig. 3, so as to bear upon the rearmost plate. This follower, which extends down behind the plates, is provided with one or more,—preferably two,—forwardly-extending rack bars $g$, shown in Figs. 2, 5 and 6, which rack bars are designed to be engaged by a pinion or pinions $h$, rotating with a shaft I journaled in suitable brackets $i$ on the under side of the top or cover of the box A.

The shaft I is provided at one end with a thumb nut $j$ by which to turn it, and is provided also with a ratchet wheel $k$ which is adapted to be engaged by a pawl $l$ pivoted to the side of the top of the box A, as shown in Figs. 1 and 5.

J indicates a spring secured at one end to the under side of the cover K and at the opposite end to the shaft I, about which latter it is coiled. This spring tends to urge the follower and the plates in front of the same forward, and the force or action of the spring may be overcome or neutralized at any point by means of the pawl and ratchet before referred to. The pawl $l$ is adapted to engage a notched bracket $m$ secured to the side of the box A so as to hold the pawl into or out of engagement with the ratchet wheel.

L indicates a slide or bar seated in a recess in the under side of the cover K as shown in Fig. 5. This slide is provided at its forward end with a pin or stud $n$ and a hook $o$, while at its opposite end it is provided with a spring tongue $p$ and one or more downwardly-projecting lips, arms or lugs $q\ q$, as shown in Figs. 5, 6 and 7. This bar or slide L works over the top of a bifurcated plate M pivoted in brackets $r$ to the under side of the cover K, which cover, as shown in Fig. 6, is recessed to receive the arms of the plate M. This plate is provided at the end of each of its arms with a downwardly-projecting lip $s$ which, when the slide L is moved rearwardly to its full limit, shall be in the same vertical plane with the projections or lips $q$ formed on the said slide L.

The plate M is designed to rock or tip vertically so that when the bar or slide L is moved backward, the lips or flanges $s$ of the plate M shall move into the recess formed to receive them; but when the slide L is moved forward the plate M will rock or tip so as to throw its lips or flanges down into operative position. In order to effect this rocking or tipping of the plate M, I provide the slide L with an inclined lug $t$, Figs. 5, 6, and 7, which is designed to ride over the top of the forwardly-projecting portion of the plate M,—the latter plate being held in its normal position by means of a spring $u$ secured to the under side of the cover K as shown in Figs. 2, 5, 6 and 7. Upon reference to Fig. 2 it will be seen that the front plate is now ready or in position to be exposed. Now when it is desired to transfer this exposed plate to its compartment C and to bring a new plate into proper position for exposure, it is only necessary to move the bar or slide L rearwardly as shown in Fig. 2. This rearward movement of the slide L causes its cam $t$ to rock or tip the plate M and throw the arms of the latter up into the recesses in the under side of the cover. The downwardly-projecting lips or flanges $s$ of the plate M which were bearing against the front film or plate are thus moved upward out of contact with the said film or plate, and the downwardly-projecting lips or projections $q\ q$ of the slide L are brought against the upper edge of the said front film or plate. As the slide L is thus moved rearwardly, its spring tongue $p$, which is shouldered or made angular as more clearly illustrated in Fig. 7, rides over the top of the film or plate which latter is then embraced on its forward face by the lips or projections $q\ q$, and on its rear face by the spring tongue $p$. Now as the slide L is moved forwardly, the exposed plate which is held by the said slide L as above described, is carried forward at its upper end, but the instant that the cam $t$ of the slide L moves from over the plate M, the spring $u$ will throw the arms of the said plate M down behind the exposed plate and in front of the unexposed plate, thereby preventing more than one plate being moved forward at a time. Continuing the forward movement of the slide L, the exposed plate is carried forward as indicated in Fig. 7 until its upper edge rides off the lips or projections $q$, whereupon it falls down into the compartment C.

From the foregoing it will be observed that the retaining lips $q$ and $s$ alternate in their action; that is to say, when the lips $q$ are in position to support the exposed front plate, the lips $s$ will be up, out of the way, but the instant that the lips $q$ begin to carry the exposed plate forward, the lips $s$ will drop down in front of the new plate and prevent the latter from falling or tipping out of position, it being understood, of course, that every time a plate is removed the spring J will, acting through the shaft I and the rack bars and pinions $g$ and $h$, carry the follower H forward a distance equal to the thickness of the plate.

The top K is slotted as at $v$ to receive the thumb-piece or handle $w$ which is secured to the slide L and by means of which the latter is actuated.

In order that the exact number of plates remaining in the compartment B may be accurately ascertained, I provide one of the rack bars $g$ with numerals spaced a distance apart corresponding to the thickness of the plates employed, which numbers may be observed through a hole or opening $x$ made in the top plate as shown in Fig. 1.

In order to properly support and sustain the exposed plates which fall into the compartment C, I provide the rear wall of the said compartment with a series of horizontal grooves or seats $y$, spaced a distance apart equal to the thickness of the plates. At the opposite side of the compartment I arrange a yielding wall N which is provided with similar grooves $y$ and pivoted at its lower end as shown in Fig. 2. This wall N is connected by a link or stud $z$ with an upright lever O pivoted at its lower end to the partition wall P, and projecting at its upper end in position to be struck with or engaged by the hook $o$ on the under side of the slide L. From this construction it will be seen that when the slide L is moved forward to carry the exposed plate from the compartment D into the compartment C, the hook $o$ engaging the upper end of the lever O, will carry said lever forward a slight distance and retract the grooved wall N of the compartment C so as to momentarily enlarge said compartment and allow the upper edge of the exposed plate to clear the ribs or projections separating the grooves $y$. The instant that the slide L moves back a slight distance the hook $o$ will be thrown out of engagement with the lever and the latter will be returned to its normal position by means of a spring Q which is interposed between the wall N and the partition P, as shown in Fig. 2.

It will be seen upon reference to Fig. 2 that after the slide L has been moved rearwardly a slight distance, the lever O is released and the wall N returned to its normal position, the exposed plates will be found to be seated at opposite ends in the grooves $y\ y$, and if the camera be turned upside down, these plates will remain in position and will be prevented from being injured or from injuring each other.

In order to remove the exposed plates from the compartment C, I provide the box A with an opening closed by a door R, as shown in Fig. 4, and I apply to this opening the box F which will be centered and secured over said opening in the same manner essentially as it was centered and applied to the opening $a$ in inserting the plates. In the front wall of the box is formed the ordinary opening S which is designed to be closed or covered by a shutter which, in the present instance, is made in the form of a disk T, pivoted or journaled upon the inner face of the front wall of the box. This disk is provided with a pin or stud $b'$ which is designed to be engaged by a spring arm $c'$ secured to the end of a spool U, which latter is designed to turn freely upon the stud or axis $d'$ upon which the shutter turns. When the spool turns backward, its spring arm $c'$ will ride over and be forced back by the pin $b'$ on the shutter, but when the spool turns in the reverse direction, the spring arm will, striking against the pin or stud $b'$, carry the shutter with it. About the spool U passes a band V which is secured at one end to a spring W and at its opposite end to a lever X mounted upon the front wall of the box A,—the arrangement being such that as the band winds off at one end it winds on at the other and vice versa. This shutter will be provided with one or more openings as is customary, and is further provided on its rear face with one or more pins Y as shown in Figs. 2, 3 and 4, which pins are designed to act in conjunction with other devices, as a stop mechanism for limiting the movement of the shutter.

The lever X to which I have before referred, is provided at its upper end with an inclined arm Z, which is designed to be struck or engaged by the pin $n$ on the forward end of the slide L as shown in Fig. 3, so that when the slide moves forward, the pin $n$, riding against the inclined arm Z of the lever X, will tip or rock said lever against the force of its spring $a'$. This movement of the lever X, acting through the band V and the spool U, places the spring W under tension and carries the spring arm $c'$ back behind the stud or projection $b'$, as before stated. As both springs $a'$ and W are put under tension by this movement of the lever X, it is necessary to provide some means for holding the shutter stationary, and to secure this result I employ an elbow lever $e'$ which is pivoted to the front wall of the box A as shown in Figs. 3 and 4. The upper or longer arm of this lever $e'$ is bifurcated, and is designed to engage with the pins Y on the rear face of the shutter, while the rear end of the lever extends downwardly opposite the inner end of a push pin $f'$ projecting out through the side of the box or case A as shown in Figs. 1 and 4. Now with the springs $a'$ and W under tension and the lever $e'$ engaging the pin Y, the shutter will be prevented from turning or moving, but by pressing upon the push button $f'$ the lever $e'$ will be rocked or tipped against the tension of a flat spring $g'$ and the lever thrown to such position as to allow the pin Y to pass between its arms. As soon as the lever $e'$ is brought to this position the spring W, acting through the band or connection V, spool U, arm $c'$ and stud $b'$, turns or rotates the shutter, covering and uncovering the opening S with such speed as to give in effect an instantaneous exposure. As the spring W unwinds its band from the spool, it of course winds up the band connected to the lever X in order that the subsequent actuation of the lever X by the slide L may serve to turn the drum or spool U backward. The tension of the spring W is regulated or controlled by means of thumb screw $h'$, Figs. 1, 3 and 4.

Where it is desired to give a time exposure in lieu of an instantaneous exposure, I employ the lever $i'$ which, as shown in Figs. 3 and 4, is pivoted to the front wall of the box A. This lever is provided at one end with a finger $j'$ which is designed to engage the pin Y and hold the shutter against movement. The other end of the lever extends down opposite a second push pin $k'$ passing out through the side wall of the box A. When the shutter spring is under tension and the lever $e'$ is in engagement with one of the pins Y, the lever $i'$ will be rocked or tipped so as to throw its arm or finger $j'$ down behind or in rear of the pin Y which is at that time engaged by the lever $e'$. Now by pushing upon the pin $f'$ and rocking the lever $e'$, the shutter will be released and it will partake of a partial revolution, it being prevented from making a complete revolution by reason of the finger or arm $j'$ engaging that pin Y which was next to or behind the pin formerly engaged by the lever $e'$. The shutter is now held with its opening in line with the lens by means of the arm or finger $j'$ of the lever $i'$, and after a sufficient time has elapsed the lever $i'$ is raised up out of engagement with the shutter by pushing upon the pin $k'$, thus allowing the spring W to complete the rotation of the shutter. In order to actuate the lever $i'$, that is, in order to throw it out of action, I employ a thumb button $l'$ which projects out through the front of the case or box A as shown.

While I have described the lever X and the spring W as being connected to the spool U by a single band V, it is obvious that two separate bands may be employed.

The box or holder F may be one of a series of boxes, all of which are made to fit the pins $b$ around the opening $a$, and are designed more particularly for tourists who wish to carry a number of boxes filled with plates, thereby enabling them to charge the camera and deliver the same plates after being exposed, into the box from which they were emptied without the necessity of a dark room, it being understood, of course, that these boxes are filled in a dark room before starting. However, the camera may be filled when convenient in a dark room without the use of the box F.

As before stated, one of the rack bars $g$ of the follower H is provided with a series of numbers so as to serve as an indicator. This construction and arrangement will be adopted when the camera is designed for use only in connection with one class of plates, for instance, glass plates, but in order to adapt the machine, or more properly speaking, its indicator, to the use of both glass plates and films, both of the rack bars will be graduated or numbered as indicated in Fig. 9, the numbers of one rack bar being spaced to conform to the thickness of the glass plates, while those on the other rack-bar are graduated to conform to the thickness of the films.

Having thus described my invention, what I claim is—

1. In a camera substantially such as shown and described, the box A provided with the fixed exposed-plate compartment C, one wall of which is stationary and grooved, while the opposite wall is likewise grooved and movable toward and from the stationary wall.

2. In a camera, the combination with the plate N forming one wall of the exposed-plate-compartment, of a slide L for transferring the exposed plate to the said compartment, and intermediate mechanism for operating the plate N, by means of the slide all substantially as shown and described.

3. In a camera, the box A having a movable plate N forming one wall of the exposed-plate-compartment, an actuating lever O for said plate, and a slide L for transferring the exposed plate to the said compartment, and acting upon the upper end of said lever.

4. In a camera, the follower H provided with forwardly-extending rack bars $g$, in combination with the shaft I carrying the pinions $h$; bearings $i$ in which said shaft is journaled, a spring J tending to rotate the shaft I to urge the follower forward, and the pawl and ratchet for holding the shaft against rotation.

5. In a camera, the combination with the plate M having the lips $s$ to engage the plates or films, of the slide L provided with lips $q$ and a spring tongue $p$, and serving to throw the plate M out of action.

6. In a camera, the combination with the pivoted plate M having the retaining lips $s$ and a spring $u$, of the slide L provided with lips $q$, spring tongue $p$, and a cam $t$ to tip or rock the plate.

7. In a camera, the combination with a plate M adapted to hold the films or plates at their upper edges, of a slide as L adapted to throw the plate M out of action and to engage the exposed plate and move it out of the way.

8. In a camera, the combination with a plate M provided with lips $s$, of a slide L provided with lips $q$ and spring tongue $p$,—the plate M and slide L alternating in their action substantially as shown and described.

In witness whereof I hereunto set my hand in the presence of two witnesses.

CHAS. B. WITHINGTON.

Witnesses:
 MAUDE L. YOUNG,
 F. L. STEVENS.